(12) United States Patent
Mishra et al.

(10) Patent No.: US 12,223,369 B2
(45) Date of Patent: Feb. 11, 2025

(54) MESSAGE ORIENTED MIDDLEWARE CLUSTER SYNCHRONIZATION

(71) Applicant: Dell Products L.P., Round Rock, TX (US)

(72) Inventors: Abhijit Mishra, Bangalore (IN); Krishna Mohan Akkinapalli, Leander, TX (US); Satish Ranjan Das, Round Rock, TX (US); Bijan Kumar Mohanty, Austin, TX (US); Hung Dinh, Austin, TX (US); Saravanan Kannan, Bangalore (IN); SivaMohan Nimmakayala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 17/370,384

(22) Filed: Jul. 8, 2021

(65) Prior Publication Data
US 2023/0010417 A1 Jan. 12, 2023

(51) Int. Cl.
*G06F 9/54* (2006.01)
*G06N 20/00* (2019.01)

(52) U.S. Cl.
CPC .............. *G06F 9/546* (2013.01); *G06N 20/00* (2019.01)

(58) Field of Classification Search
CPC ................................. G06F 9/546; G06N 20/00
See application file for complete search history.

(56) References Cited

U.S. PATENT DOCUMENTS

2010/0162383 A1* 6/2010 Linden ................ H04L 41/0659 726/13
2020/0364607 A1* 11/2020 BahenaTapia ........... G06N 7/01
(Continued)

FOREIGN PATENT DOCUMENTS

CN 102668516 B * 9/2014 ............. G06F 9/546

OTHER PUBLICATIONS

Jinfu Wang; Management of Temporally and Spatially Correlated Failures in Federated Message Oriented Middleware for Resilient and QoSAware Messaging Services; Apr. 2015; 141 pages (Year: 2015).*

(Continued)

*Primary Examiner* — Kevin L Young
*Assistant Examiner* — Kimberly L Jordan
(74) *Attorney, Agent, or Firm* — Ryan, Mason & Lewis, LLP

(57) ABSTRACT

A method comprises collecting message-oriented-middleware system parameters from a plurality of message-oriented-middleware clusters, analyzing the parameters using one or more machine learning algorithms, and predicting, based at least in part on the analyzing, at least one anomaly in a message-oriented-middleware cluster of the plurality of message-oriented-middleware clusters. In the method, message metadata is collected from the message-oriented-middleware cluster, and at least part of the message metadata is transmitted to one or more remaining ones of the plurality of message-oriented-middleware clusters. At least the part of the message metadata corresponds to messaging operations to be transferred from the message-oriented-middleware cluster to the one or more remaining ones of the plurality of message-oriented-middleware clusters.

20 Claims, 12 Drawing Sheets

(56) References Cited

U.S. PATENT DOCUMENTS

| | | | | |
|---|---|---|---|---|
| 2021/0135966 A1* | 5/2021 | Dinh | .................... | H04L 43/0852 |
| 2021/0136095 A1* | 5/2021 | Dinh | ....................... | G06N 5/003 |
| 2021/0208971 A1* | 7/2021 | Srinivasan | ............ | G06F 11/008 |
| 2022/0038332 A1* | 2/2022 | Umakanth | .......... | H04L 41/5016 |
| 2023/0229574 A1* | 7/2023 | Gandluri | ............. | G06F 11/3006 714/4.11 |

OTHER PUBLICATIONS

Xiaohui Gu, Haixun Wang; Online Anomaly Prediction for Robust Cluster Systems; 2009; 12 pages (Year: 2009).*

Jinfu Wang, John Bigham; Anomaly Detection in the Case of Message Oriented Middleware; Dec. 1-5, 2008; 3 pages (Year: 2008).*

Jinfu Wang, Peng Jiang, John Bigham, Bob Chew, Milan Novkovic, Ilesh Dattani; Adding Resilience to Message Oriented Middleware; Apr. 13-16, 2010; 7 pages (Year: 2010).*

Friedhelm WolfJaiganesh BalasubramanianSumant TambeAniruddha GokhaleDouglas C. Schmidt; Supporting component-based failover units in middleware for distributed real-time and embedded systems; Aug. 10, 2010; 17 pages (Year: 2010).*

Jens Happe, Holger Friedrich, Steffen Becker, Ralf H. Reussner; A Pattern-Based Performance Completion for Message-Oriented Middleware; Jun. 24-26, 2008; 12 pages (Year: 2008).*

Nicolas Nannoni; Message-oriented Middleware for Scalable Data Analytics Architectures; Feb. 13, 2015; 115 pages (Year: 2015).*

Sara Kardani-Moghaddam*, Rajkumar Buyya, and Kotagiri Ramamohanarao; Performance Anomaly Detection Using Isolation-Trees in Heterogeneous Workloads of Web Applications in Computing Clouds; Mar. 26, 2019; 34 pages (Year: 2019).*

Hao Yang, Minkyong Kim, Kyriakos Karenos, Fan Ye, and Hui Lei; Message-Oriented Middleware with QoS Awareness; 2009; 15 pages (Year: 2009).*

Chew, Zhen Bob; Modelling Message-Oriented-Middleware Brokers using Autoregressive Models for Bottleneck Prediction; 2013; 179 pages (Year: 2013).*

Xiao Zhang; Fanjing Meng; Jingmin Xu; PerfInsight: A Robust Clustering-Based Abnormal Behavior Detection System for Large-Scale Cloud; Jul. 2-7, 2018; 4 pages (Year: 2018).*

English translation of foreign reference CN-102668516-B (Year: 2014).*

Wikipedia, "Computer Cluster," https://en.wikipedia.org/w/index.php?title=Computer_cluster&oldid=1018552020, Apr. 18, 2021, 11 pages.

Wikipedia, "Isolation Forest," https://en.wikipedia.org/w/index.php?title=Isolation_forest&oldid=1029032059, Jun. 17, 2021, 7 pages.

* cited by examiner

```
import numpy as np
import pandas as pd
import seaborn as sns
from sklearn.ensemble import IsolationForest
import matplotlib.pyplot as plt
from sklearn.model_selection import train_test_split data = pd.read_csv('../data/MOMParameter.csv')

data = data.drop(['Time'] , axis=1)

outliers = data.loc[data['Pattern']==1]
normal = data.loc[data['Pattern']==0]

outliers = outliers.drop(['Pattern'] , axis=1)
normal = normal.drop(['Pattern'] , axis=1)

X_train = np.array(normal.iloc[0:142403,:])
X_test = np.array(outliers)
```

FIG. 4

```
#Isolation Forest model is created with the hyperparameters
max_features=1.0
n_estimators=50
max_samples='auto'
contamination=float(0.2)
forest_model=IsolationForest(max_features = max_features,
                    n_estimators=n_estimators,
      max_samples=max_samples,
                    contamination=contamination)

forest_model.fit(X_train)

y_pred_train = clf.predict(X_train)
y_pred_test = clf.predict(X_test)

print("Accuracy dev :", list(y_pred_dev).count(1)/y_pred_dev.shape[0])
print("Accuracy test:", list(y_pred_test).count(-1)/y_pred_test.shape[0])
```

FIG. 4 (cont'd)

```
public void momConnectQ(String host1, String qMgrName1, String channel1, String
queueName1, int port1, boolean switchflg,
                                                String host2, String qMgrName2,
String channel2, String queueName2, int port2) throws MQException {
    try
    {
        if (switchflg){
            momSetProperties(host1,qMgrName1,channel1,queueName1, port1);
            momBrowseFirstMsg(qMgr1, qMgrName1, localQueue, queueName1);
        } else {
            momSetProperties(host2,qMgrName2,channel2,queueName2, port2);
            momBrowseFirstMsg(qMgr2, qMgrName2, localQueue, queueName2);
        }
```

FIG. 7

```
} catch (MQException ex) {
        System.out.println(
                "An MQSeries error occured
                        +
mqConnectQ : Completion code "
                        + " Reason code "
ex.completionCode
                        + ex.reasonCode);

} catch (Exception e) {
        System.out.println("An unknown exception occured
mqConnectQ :" + e.toString());
    }
}
```

MESSAGE ORIENTED MIDDLEWARE CLUSTER SYNCHRONIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for synchronizing message-oriented-middleware clusters.

BACKGROUND

Message delivery is crucial to the success of enterprise information technology (IT) system operations. In some enterprises, for example, hundreds of mission critical applications use a messaging infrastructure to process hundreds of million messages each day. In addition, enterprises may utilize a variety of different message-oriented-middleware (MOM) products to deliver their messages.

Under conventional approaches, when servers fail and MOM clients are required to switch from one MOM server group to another MOM server group, the new MOM server group lacks information corresponding to previously committed messages. As a result, message processing is restarted from the beginning (e.g., a first message) and not where message processing left off prior to the failure. This leads to duplicity and seriously impacts scalability and operation management, thereby hindering active-active architectures.

SUMMARY

Embodiments provide a cluster synchronization platform in an information processing system.

For example, in one embodiment, a method comprises collecting message-oriented-middleware system parameters from a plurality of message-oriented-middleware clusters, analyzing the parameters using one or more machine learning algorithms, and predicting, based at least in part on the analyzing, at least one anomaly in a message-oriented-middleware cluster of the plurality of message-oriented-middleware clusters. In the method, message metadata is collected from the message-oriented-middleware cluster, and at least part of the message metadata is transmitted to one or more remaining ones of the plurality of message-oriented-middleware clusters. At least the part of the message metadata corresponds to messaging operations to be transferred from the message-oriented-middleware cluster to the one or more remaining ones of the plurality of message-oriented-middleware clusters.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3A depicts a plot illustrating isolation of a normal state point in an illustrative embodiment.

FIG. 3B depicts a plot illustrating isolation of an anomalous state point in an illustrative embodiment.

FIG. 4 depicts example pseudocode for anomaly prediction in an illustrative embodiment.

FIG. 7 depicts example pseudocode for cluster migration in an illustrative embodiment.

DETAILED DESCRIPTION

Figure 1:
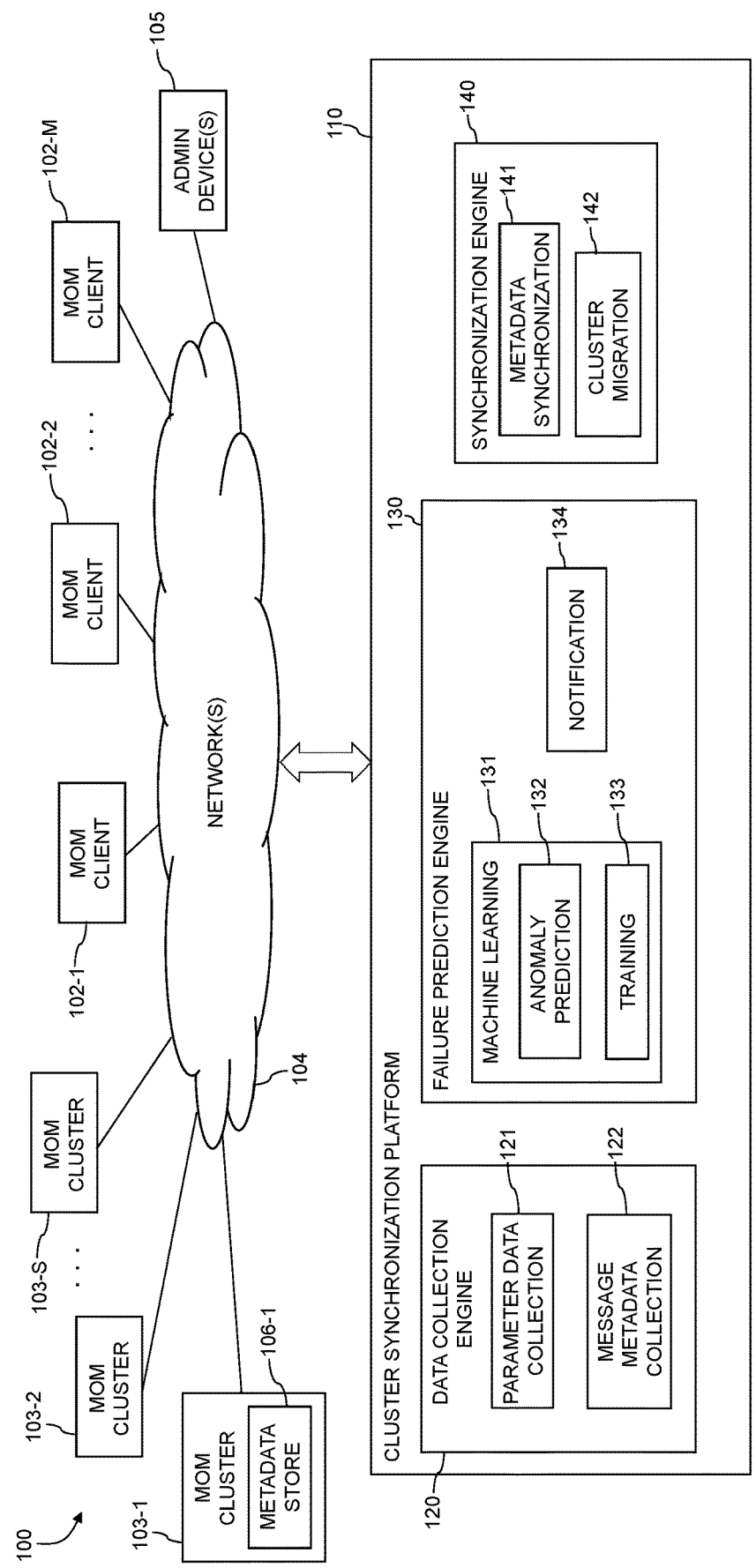
FIG. 1 depicts an information processing system with a cluster synchronization platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website.

As used herein, the term "middleware" is to be broadly construed to refer to software that links different applications. Some examples of middleware are products that establish connections between web servers and database systems and connections between message producers and consumers.

Message-oriented-middleware or "MOM" providers or systems include architectures with, for example, APIs and administrative tools to route and deliver messages. In an embodiment, the MOM providers or systems respectively run on different operating systems and/or platforms or different implementations of the same operating system and/or platform. For example, the MOM providers or systems are of different types, and require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA lightweight machine to machine (LWM2M). Some non-limiting examples of MOM providers are IBM® MQ (International Business Machines Corporation, Armonk, NY), RabbitMQ® (Pivotal Software, Inc., San Francisco, CA), Apache™ ActiveMQ® and Apache™ Kafka® (Apache Software Foundation, Wakefield, MA).

As used herein, the term "cluster" is to be broadly construed to refer to multiple devices, such as, for example, multiple servers (also referred to herein as "nodes"), that work together to deliver services. Nodes of a cluster can be redundant. In one or more embodiments, a MOM provider or system includes a cluster (or multiple clusters) to provide the services of the MOM provider or system. A cluster of a MOM provider or system is referred to herein as a "MOM cluster."

FIG. 1 shows an information processing system 100 configured in accordance with an illustrative embodiment. The information processing system 100 comprises MOM clients 102-1, 102-2, . . . 102-M (collectively "MOM clients 102"), MOM clusters 103-1, 103-2, . . . 103-S (collectively "MOM clusters 103"), and one or more administrator devices ("Admin device(s)") 105. The MOM clients 102, MOM clusters 103 and administrator devices 105 communicate over a network 104 with a cluster synchronization platform 110. The MOM clients 102 comprise message producers (also referred to herein as "publishers") and/or message consumers (also referred to herein as "subscribers"). Messages from producer/publisher MOM clients 102 may be pushed to consumer/subscriber MOM clients 102 using one or more MOM clusters 103. For example, a message can be published by a producer/publisher MOM client 102, and sent to consumer/subscriber MOM clients 102 that have registered to receive messages for the topic to which the message pertains. In some embodiments, MOM clients 102 receive messages based on a subscription to a certain topic. A MOM cluster 103 or individual server of a MOM system provides the services to push messages with a topic matching a subscription from a publisher MOM client 102 to a subscribed MOM client 102. Sending a message is referred to as publishing, and registering to receive messages for a topic is referred to as subscribing. If communication between MOM clients 102 is topic-based, a relationship is not required between MOM clients 102 in order for a client to receive a message from another client.

The MOM clients 102, MOM clusters 103 and administrator devices 105 can comprise, for example, Internet of Things (IoT) devices, desktop, laptop or tablet computers, mobile telephones, or other types of processing devices capable of communicating with the cluster synchronization platform 110 over the network 104. Such devices are examples of what are more generally referred to herein as "processing devices." Some of these processing devices are also generally referred to herein as "computers." The MOM clients 102, MOM clusters 103 and administrator devices 105 may also or alternately comprise virtualized computing resources, such as virtual machines (VMs), containers, etc. The MOM clients 102, MOM clusters 103 and/or administrator devices 105 in some embodiments comprise respective computers associated with a particular company, organization or other enterprise. The variable M and other similar index variables herein such as K, L and S are assumed to be arbitrary positive integers greater than or equal to two.

The terms "user" or "administrator" herein are intended to be broadly construed so as to encompass numerous arrangements of human, hardware, software or firmware entities, as well as combinations of such entities. Cluster synchronization services may be provided for users utilizing one or more machine learning models, although it is to be appreciated that other types of infrastructure arrangements could be used. At least a portion of the available services and functionalities provided by the cluster synchronization platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cluster synchronization platform 110, as well as to support communication between the cluster synchronization platform 110 and connected devices (e.g., administrator devices 105) and/or other related systems and devices not explicitly shown.

In some embodiments, the administrator devices 105 are assumed to be associated with repair technicians, system administrators, information technology (IT) managers, software developers, release management personnel or other authorized personnel configured to access and utilize the cluster synchronization platform 110.

Each of the MOM clusters 103 includes a metadata store, such as, for example, metadata store 106-1 corresponding to MOM cluster 103-1. Metadata stores for the remaining MOM clusters 103 in FIG. 1 are not shown. The metadata store 106-1 stores message metadata comprising, for example, details of message processing such as, but not necessarily limited to, message offset information, last message read information, last message committed information, timestamps, topic attributes, transaction identifiers and/or details about the protocols, interfaces and channels being used to deliver the messages. The timestamps may comprise, for example, a last message read timestamp and a last message committed timestamp. The transaction identifier may comprise, for example, an identifier of a pending 2-phase commit message.

The message metadata is cluster specific, and respective MOM clusters 103 may not contain the same message metadata as each other. For example, under conventional techniques, a consumer MOM client may be processing a batch of 100 persistent messages, and at the $20^{th}$ message, a first cluster processing the messages fails due to some problem (e.g., system problems causing a listener port to drop). Under current approaches, a second cluster does not include the metadata corresponding to the information of the already committed messages (e.g., offsets to the logged space). As a result, if operations are switched to the second cluster, message processing will start from a first message instead of the $20^{th}$ message. Unlike conventional approaches, the embodiments provide a predictive and proactive failover framework for MOM systems, where cluster anomalies are predicted prior to their occurrence and necessary message state metadata is synchronized between primary and failover clusters. As a result, when messaging operations are migrated from a primary MOM cluster to a failover MOM cluster, the failover cluster has the necessary state information so that messaging continues from a point where failover occurred and transactional integrity and quality of service (QoS) are maintained. Alternatively, messaging operations are migrated from a primary MOM cluster to a failover MOM cluster before a failure occurs (i.e., in anticipation of a failure) and due to the synchronization of the metadata, the same result of continuing message operations from a point of the last committed message is achieved when moving operations between MOM clusters 103.

According to an embodiment, different servers, different MOM platforms and different message channels are associated with respective ones of the MOM clusters 103, which use different protocols and interfaces. In an illustrative embodiment, the MOM clusters 103 may correspond to different MOM providers (e.g., IBM® MQ, RabbitMQ®, Apache™ ActiveMQ® and Apache™ Kafka®). In another illustrative embodiment, at least some of the MOM clusters 103 may correspond to the same MOM provider.

The cluster synchronization platform 110 in the present embodiment is assumed to be accessible to the MOM clients 102, MOM clusters 103 and/or administrator devices 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cluster synchronization platform 110 is configured to detect anomalies, predict any upcoming errors and control the migration of operations to a failover cluster before an actual outage requires reactive error handling. By leveraging machine learning for anomaly detection, the embodiments monitor various system parameters including MOM system metrics. By measuring the normal parameter values, the machine learning model can detect anomalies when the parameter values deviate from the normal values. Based on the identification of one or more anomalies, the cluster synchronization platform 110 can make a decision to switch to a secondary cluster before an outage of the primary cluster occurs. In this way, issues in a primary cluster can be investigated, while messages flow uninterrupted through a secondary cluster.

Referring to FIG. 1, the cluster synchronization platform 110 includes a data collection engine 120, a failure prediction engine 130 and a synchronization engine 140. The data collection engine 120 includes a parameter data collection layer 121 and a message metadata collection layer 122. The failure prediction engine 130 includes a machine learning layer 131 comprising anomaly prediction and training layers 132 and 133, and a notification layer 134. The synchronization engine 140 includes a metadata synchronization layer 141 and a cluster migration layer 142.

The parameter data collection layer 121 of the data collection engine 120 collects MOM system parameters from the MOM clusters 103. The system parameters comprise, for example, central processing unit (CPU) utilization parameters (e.g., processing volume, memory utilization, number of operations), storage utilization parameters (e.g., storage volume), input/output (TO) parameters (e.g., throughput, TO operations per second (TOPS), latency), message queue depth (e.g., number of messages in message queues waiting to be delivered), channel agent values and channel connection agent values, as well as specific MOM provider parameters.

The failure prediction engine 130, more particularly, the anomaly prediction layer 132 of the machine learning layer 131, analyzes the collected parameters using one or more machine learning algorithms, and predicts, based at least in part on the analyzing, one or more anomalies in one or more of the MOM clusters 103. The anomaly prediction layer 132 leverages an unsupervised learning approach and machine learning models to detect anomalies in the MOM clusters 103 to accurately predict outages. By predicting a potential outage before it occurs, the anomaly prediction layer 132 provides a basis for a decision to migrate messages to a different cluster, thus proactively eliminating the effects of an outage prior to a failure and enabling correction of problems in messaging systems without any service interruptions.

The anomaly prediction layer 132 analyzes the system parameters to identify abnormal patterns in the data to determine outliers. For example, based on historical system parameter data, the training layer 133 trains the machine learning model to identify what constitutes normal operational parameters in MOM clusters 103. The historical parameter data comprises, for example, the same or similar attributes to those found in the collected system parameter data, such as, for example, infrastructure parameters like CPU utilization, storage utilization and TO parameters, as well as messaging platform parameters such as queue depth, channel agent values, channel connection agent values and specific MOM provider parameters (e.g., Kafka® specific parameters). Deviations from normal operations are considered anomalies by the anomaly prediction layer 132.

Figure 2:
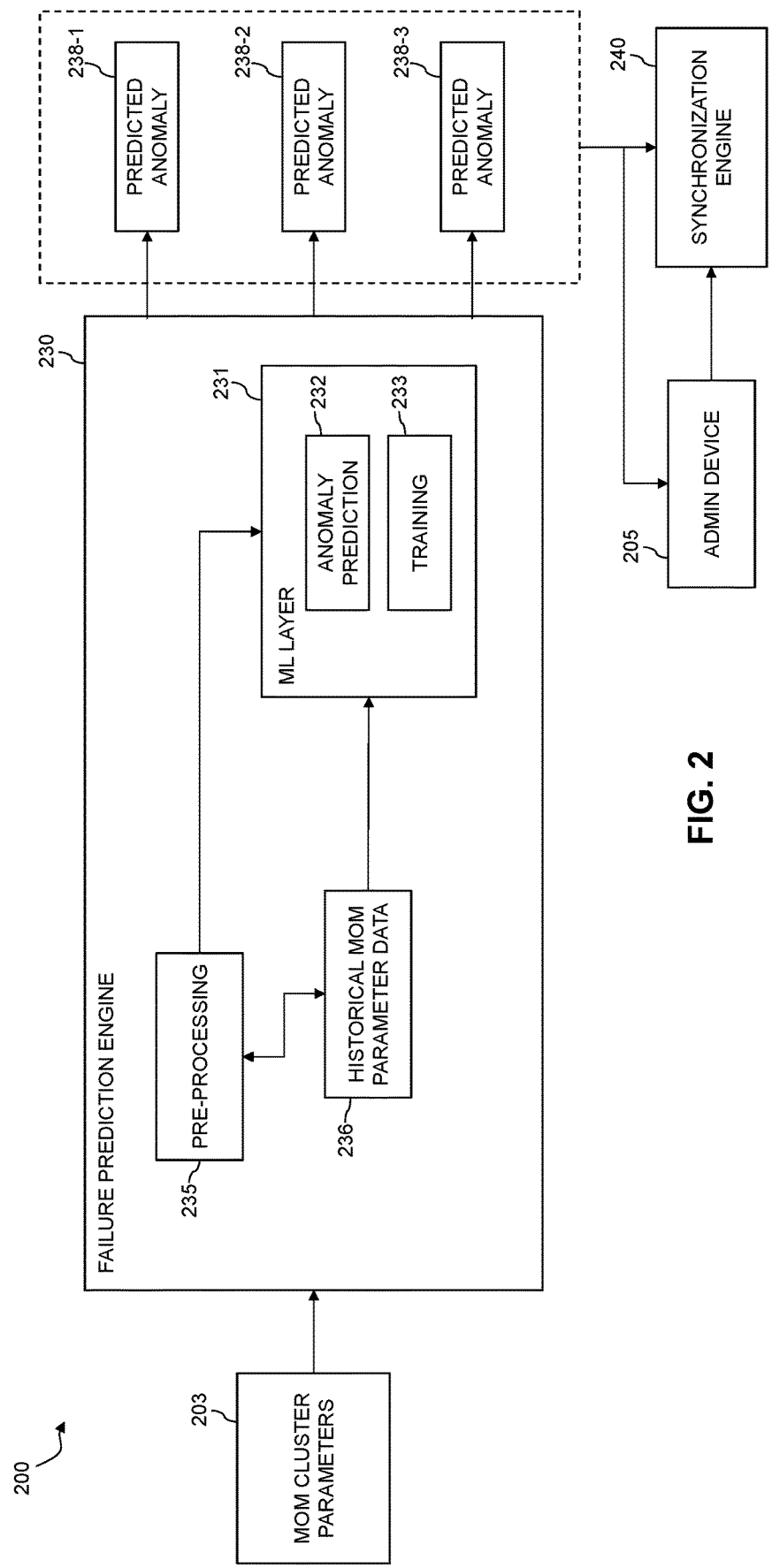
FIG. 2 depicts an operational flow for anomaly prediction in an illustrative embodiment.

Referring to the operational flow 200 in FIG. 2, MOM cluster parameters 203 collected by, for example, a parameter data collection layer (e.g., parameter data collection layer 121) are input to the failure prediction engine 230, which is the same or similar to the failure prediction engine 130. The failure prediction engine 230 illustrates a pre-processing component 235, which processes the incoming MOM cluster parameters and the historical MOM parameter data 236 for analysis by the machine learning layer (ML) 231. For example, the pre-processing component 235 removes any unwanted characters, punctuation, and stop words. As can be seen in FIG. 2, the failure prediction engine 230 analyzes the incoming MOM cluster parameters 203 using an ML layer 231 comprising anomaly prediction and training layers 232 and 233. The ML layer 231 is the same or similar to machine learning layer 131. Based on the analysis, the anomaly prediction layer 232 generates one or more predicted anomalies (e.g., predicted anomaly 238-1, 238-2 and/or 238-3). Although three predicted anomalies 238-1 to 238-3 are shown in FIG. 2, the embodiments are not necessarily limited thereto, and more or less predicted anomalies can be generated based on incoming MOM cluster parameters 203.

The ML layer 231 leverages unsupervised learning methodology for outlier detection of the behavior of the MOM clusters 103. In an embodiment, the machine learning layer 231 (or 131) implements multivariate anomaly detection using an isolation forest algorithm, which does not require labeled training data. The isolation forest algorithm has the capacity to scale up to handle extremely large data sizes (e.g., terabytes) and high-dimensional problems with a large number of attributes, some of which may be irrelevant and potential noise. The isolation forest algorithm has relatively low linear time complexity and addresses masking and swamping effects in anomaly detection.

Figures 3A, 3B:
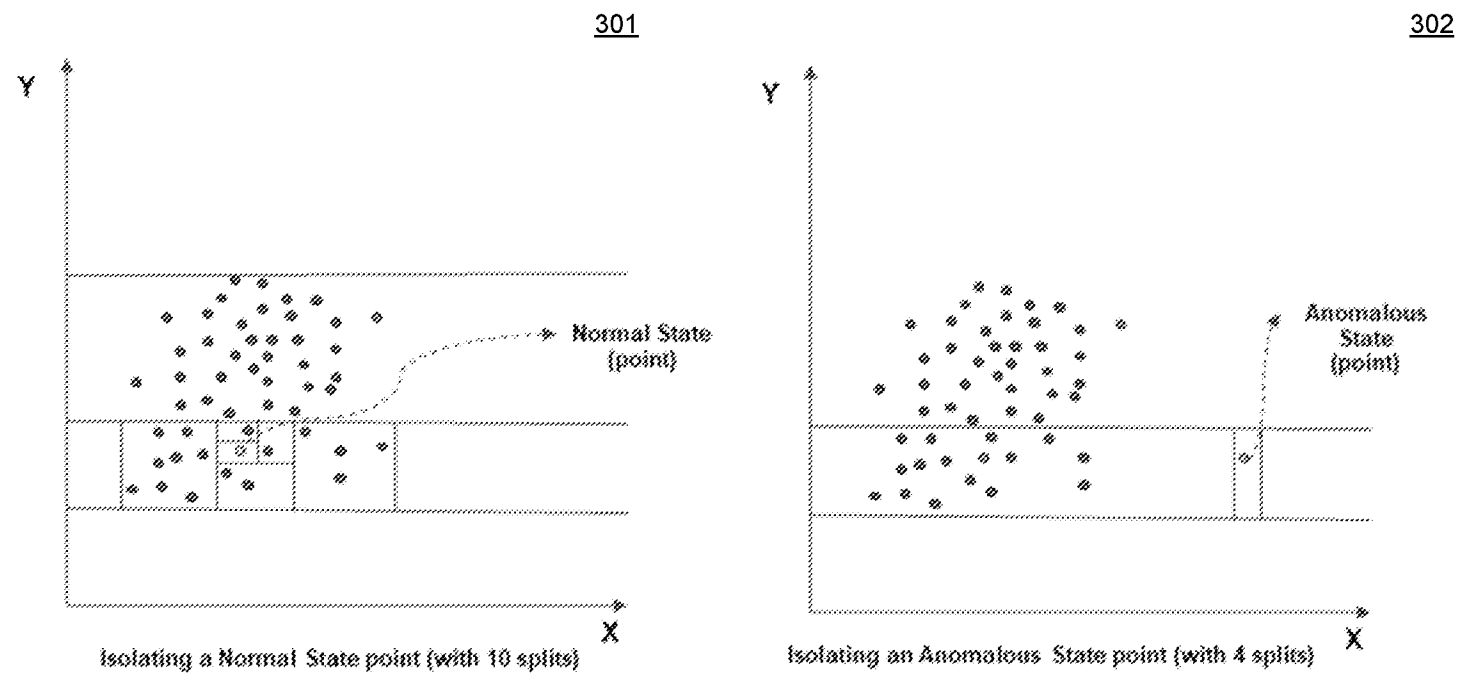

In illustrative embodiments, the machine learning model used by the ML layer 231 (or 131) isolates an anomaly by creating decision trees over random attributes. This random partitioning produces significantly shorter paths since fewer instances of anomalies result in smaller partitions, and distinguishable attribute values are more likely to be separated in early partitioning. As a result, when a group (e.g., forest) of random trees collectively produces shorter path lengths for some particular points, then they are highly likely to be anomalies. A larger number of splits are required to isolate a normal point while an anomaly can be isolated by a shorter number of splits. For example, referring to the plots 301 and 302 in FIGS. 3A and 3B, a normal state point is isolated with 10 splits and an anomalous state point is isolated with four splits. The splits are shown as horizontal and vertical lines in the plot of points. The number of splits determine the level at which the isolation occurred and is used by the anomaly prediction layer 232 (or 132) to generate an anomaly score. The process is repeated multiple number of times and the isolation level of each point is noted. Once an iteration is completed, the anomaly score of each point/instance suggests the likeliness of an anomaly. The score is a function of the average level at which the point is isolated. The top points/instances having an anomaly score exceeding a threshold are labeled as anomalies by the anomaly prediction layer 232 (or 132). Alternatively, the ML layer 231 (or 131) uses supervised learning models such as, for example, neural networks.

In illustrative embodiments, the parameter data collection layer 121 periodically collects MOM system parameters, including infrastructure resource values of MOM clusters 103 and inputs the collected parameters to the failure prediction engine 130 (or 230) to perform anomaly prediction. The machine learning model (e.g., isolation forest model) is trained using historical parameter data (e.g., historical MOM parameter data 236). If the anomaly prediction layer 132 (or 232) identifies parameter values deviating from typical values and having an anomaly score exceeding a threshold, the anomaly prediction layer 132 (or 232) identifies one or more anomalies associated with one or more MOM clusters (e.g., predicted anomalies 238-1, 238-2 and/or 238-3). FIG. 4 depicts example pseudocode 400 for anomaly prediction.

As further depicted in FIG. 2, an identified anomaly can automatically trigger synchronization and message operation migration to a new cluster or be sent as a notification to an administrator device ("Admin device") 205 for an administrator or some other user to authorize synchronization and message operation migration prior to its commencement. For example, referring to FIG. 1, a notification layer 134 of the failure prediction engine 130 issues an alert or other type of notification to be sent to an Admin device 105 informing an administrator or other user of the identified anomaly and the details thereof so that the administrator or other member of a human operational team can approve cluster synchronization and transfer of messaging operations from a first cluster to a second cluster prior to its execution. Alternatively, cluster synchronization and message operation migration is automatically performed following identification of an anomaly by the failure prediction engine 130 (or 230). Whether approval is required before execution of cluster synchronization and transfer of messaging operations may depend on whether the accuracy of the machine learning model in terms of anomaly detection exceeds a given threshold, such that a more accurate machine learning model will not require authorization or analysis by human actors prior to performing cluster synchronization and message operation transfer.

Given authorization to proceed with or automatic performance of cluster synchronization and message operation transfer, the message metadata collection layer 122 of the data collection engine 120 collects message metadata from the MOM cluster 103 having the predicted anomaly. The synchronization engine 140 (or 240) performs the tasks required to transfer messaging operations from a MOM cluster that is predicted to fail to a fail-over cluster so that transactional integrity, continued message delivery and quality of service are maintained. The metadata synchronization layer 141 of the synchronization engine 140 synchronizes message metadata between clusters following prediction of an anomaly in a given one of the MOM clusters.

Figure 5:
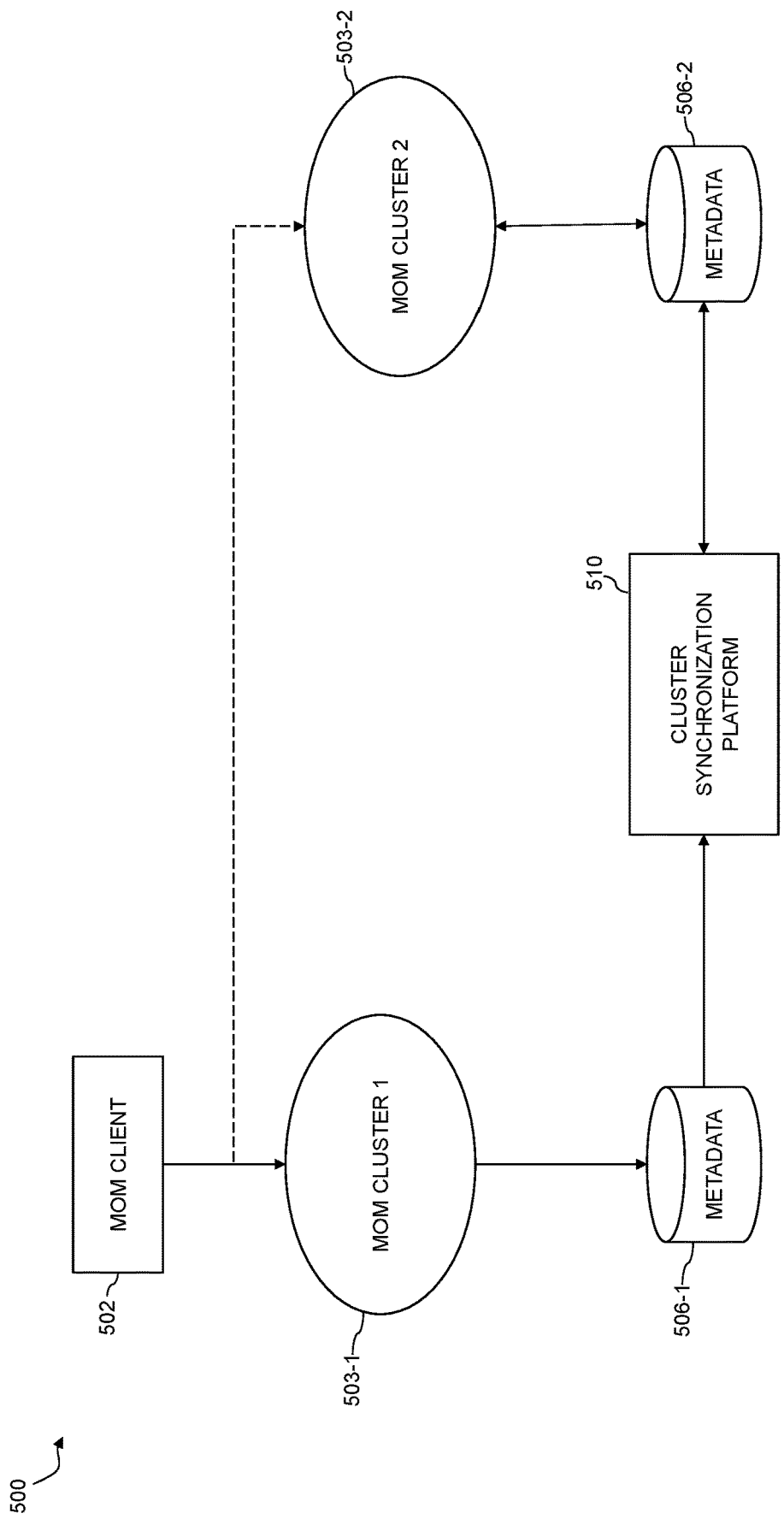
FIG. 5 depicts an operational flow for cluster migration in an illustrative embodiment.

Referring, for example, to the operational flow 500 in FIG. 5, a cluster synchronization platform 510 synchronizes MOM clusters 503-1 and 503-2 for a MOM client 502. The cluster synchronization platform 510, MOM clusters 503-1 and 503-2, and MOM client 502 are the same or similar to the cluster synchronization platform 110, MOM clusters 103 and MOM clients 102 in FIG. 1. The cluster synchronization platform 110/510 provides MOM clients 102/502 with active-active scalable MOM clusters 103/503 to seamlessly failover and migrate to without concerns about message duplicity and re-connectivity. The metadata synchronization layer 141 synchronizes message metadata (e.g., metadata 506-1 and 506-2) of respective ones of the MOM clusters 103 (e.g., MOM clusters 503-1 and 503-2). As noted herein, the message metadata includes, for example, details of message processing such as, but not necessarily limited to, message offset information, last message read information, last message committed information, timestamps, topic attributes, transaction identifiers, details about the protocols, interfaces and channels being used to deliver the messages, and details of the MOM clients 102/502.

Referring to FIG. 5, a metadata synchronization layer of the cluster synchronization platform 510 analyzes the metadata 506-1 and 506-2 of the MOM clusters 503-1 and 503-2 and broadcasts the updated metadata to the failover cluster 503-2 to update the failover cluster 503-2 with the message metadata 506-1 from the cluster 503-1 predicted to fail. The message metadata 506-1 comprises up to date message operation details which are provided to the failover cluster 503-2 so that messaging operations may seamlessly continue via the failover cluster 503-2 without duplication and with consistent QoS. Referring back to FIG. 1, in some embodiments, message operations may be transferred to more than one of the MOM clusters 103 from a cluster predicted to fail, in which case, the metadata synchronization layer 141 broadcasts the metadata of a cluster predicted to fail to multiple ones of the MOM clusters 103. Additionally, in some embodiments, more than one of the MOM clusters 103 may be predicted to fail, in which case their corresponding metadata is collected and synchronized with one or more of the remaining MOM clusters 103 to be used as failover clusters.

According to an embodiment, in the synchronization process, the metadata synchronization layer 141 compares the message metadata from one of the MOM clusters 103 with an identified anomaly with message metadata from one or more remaining ones the MOM clusters 103 to be used as a failover cluster(s) to determine differences between the message metadata from the MOM cluster predicted to fail and the message metadata from the one or more remaining ones of the MOM clusters 103 to be used as a failover cluster(s). The metadata synchronization layer 141 determines, based at least in part on the determined differences, at least a portion of the message metadata from the one or more remaining ones of the MOM clusters 103 requiring an update. Based on what message metadata is required to update the remaining ones of the MOM clusters 103 taking over messaging operations, at least part of the message metadata from the MOM cluster predicted to fail is transmitted to the one or more remaining ones of the MOM clusters 103 to be used as a failover cluster(s). In other words, the metadata synchronization layer 141 analyzes the message metadata of the cluster predicted to fail and of the failover cluster(s) to ensure that the failover cluster(s) have the required metadata reflecting up to date messaging operations. In this way, the failover cluster(s) can continue messaging operations from where they left off in the cluster predicted to fail. Any metadata determined to be lacking in the failover cluster(s) and required to complete the continuous processing of messages is transmitted from the cluster predicted to fail to the failover cluster(s). In some instances, if the primary cluster and failover cluster utilize different MOM system formats (e.g., IBM® MQ vs. Kafka®), the metadata synchronization layer 141 translates the message metadata from a format of a first MOM system to a format of a second MOM system.

Figure 6:
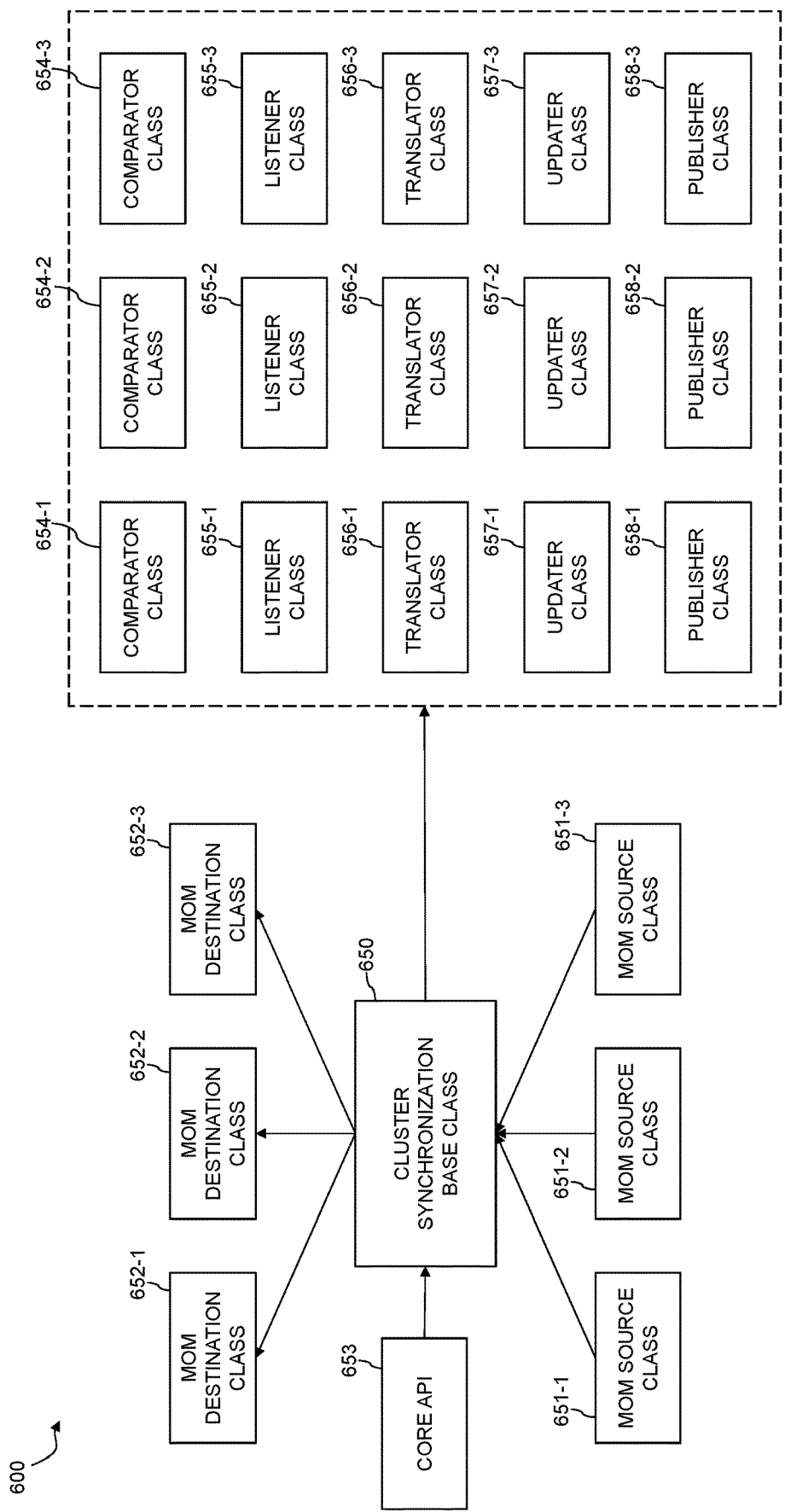
FIG. 6 depicts a class diagram for implementing cluster synchronization in an illustrative embodiment.

Referring, for example, to FIG. 6, a class diagram 600 for implementing cluster synchronization includes a cluster synchronization base class 650, which is triggered once the cluster synchronization services are started. The cluster synchronization base class 650 comprises a controller service which manages a plurality of interfaces between the cluster synchronization platform, the MOM clients 102, the MOM clusters 103 and the administrator devices 105. A plurality of MOM source classes 651-1, 651-2 and 651-3 (collectively "MOM source classes 651") and a plurality of MOM destination classes 652-1, 652-2 and 652-3 (collectively "MOM destination classes 652") are shown. The source classes 651 are end points which connect to respective source MOM metadata stores of MOM clusters 103, and the destination classes 652 are endpoints which connect to respective destination MOM metadata stores of MOM clusters 103. Source metadata stores correspond to metadata stores of MOM clusters 103 predicted to fail and destination metadata stores correspond to metadata stores of failover MOM clusters 103.

A plurality of publisher classes 658-1, 658-2 and 658-3 (collectively "publisher classes 658") and a plurality of listener classes 655-1, 655-2 and 655-3 (collectively "listener classes 655") are shown. The publisher classes 658 publish metadata change events to the metadata stores of the MOM clusters 103, which may correspond to particular MOM systems such as, for example, Kafka® topics, MQ queues and/or database (DB) queues. The listener classes 655 consume the metadata change events from metadata stores of the MOM clusters 103.

A plurality of updater classes 657-1, 657-2 and 657-3 (collectively "updater classes 657") update the metadata on the destination metadata stores of, for example, the MOM clusters 103 which are failover clusters so that the failover clusters can continue messaging operations from where they left off in the clusters predicted to fail as described herein. A plurality of comparator classes 654-1, 654-2 and 654-3 (collectively "comparator classes 654") compare the incoming metadata with the destination metadata as described herein and trigger any updates required at destination metadata stores using the updater classes 657. A plurality of translator classes 656-1, 656-2 and 656-3 (collectively "translator classes 656") translate metadata from one MOM system format to another MOM system format as described herein (e.g., IBM® MQ "Message ID" to Kafka® topic "Record Offset").

Although three of each class 651, 652, 654, 655, 656, 657 and 658 are shown in FIG. 6, the embodiments are not necessarily limited thereto, and more or less classes can be used. The number of classes are varied based on, for example, the different MOM products. For example, the classes −1, −2 and −3 may respectively correspond to IBM® MQ, RabbitMQ® and Kafka® MOM products.

A core API 653 provides one or more APIs to MOM clients 102. The one or more APIs are used by the MOM clients 102 to update or get updated metadata to use while switching between clusters 103 or different MOM products. In accordance with an embodiment, if a global traffic manager (GTM) or local traffic manager (LTM) fails to switch due to F5 errors, then a MOMSwitch Java class is triggered automatically to provide a method for MOM client applications to switch and automatically resume processing in case of fail-over between active and standby MOM servers.

The cluster migration layer 142 of the cluster synchronization engine 140 controls the migrations or transfer of messaging operations from a MOM cluster predicted to fail to the one or more remaining ones of the MOM clusters 103 to serve as failover clusters. The cluster migration layer 142, for example, comprises the controller service managing the interfaces between the cluster synchronization platform 110, the MOM clients 102, the MOM clusters 103 and the administrator devices 105. The cluster migration layer 142, for example, manages the distribution of the APIs used by the MOM clients 102 to update or get updated metadata to use while switching between clusters 103 or different MOM products. In illustrative embodiments, the cluster migration layer 142 enables active-active scalable MOM clusters 103 for MOM clients 102 to seamlessly failover and migrate different MOM platforms (e.g., Kafka®/RabbitMQ®/IBM® MQ) without concerns about message duplicity and re-connectivity as described herein with, for example, 2-phase commit XA protocol coordination. FIG. 7 depicts example pseudocode 700 for cluster migration.

According to an embodiment, the cluster synchronization platform 110 is compatible with the vendor specific software, commands, formats and data of different MOM platforms to which it is connected. The data collection engine 120 retrieves vendor specific data and metadata from MOM servers to which the cluster synchronization platform 110 is connected. The vendor specific data and metadata are in a native command format of the corresponding MOM servers and/or MOM clusters 103 from which the vendor specific data and metadata are retrieved. The data collection engine 120 retrieves data in the native command format of each MOM server.

In addition to the message metadata described hereinabove, the message metadata further includes, for example, messaging queue names, messaging queue statuses (e.g., online, offline, idle, active), messaging queue locations (e.g., Internet Protocol (IP) addresses, ports), messaging queue types, timestamps for messages entering and leaving message queues, transmission times of messages from messaging queues, connections between messaging queues and of messaging queues to message producers and message consumers, total number of messages, and/or message transmission rates.

According to one or more embodiments, the metadata store 106-1 and other data stores or databases referred to herein can be configured according to a relational database management system (RDBMS) (e.g., PostgreSQL). In some embodiments, the metadata store 106-1 and other data stores or databases referred to herein are implemented using one or more storage systems or devices associated with the cluster synchronization platform 110. In some embodiments, one or more of the storage systems utilized to implement the metadata store 106-1 and other data stores or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cluster synchronization platform 110, the data collection engine 120, failure prediction engine 130 and/or synchronization engine 140 in other embodiments can be implemented at least in part externally to the cluster synchronization platform 110, for example, as stand-alone servers, sets of servers or other types of systems coupled to the network 104. For example, the data collection engine 120, failure prediction engine 130 and/or synchronization engine 140 may be provided as cloud services accessible by the cluster synchronization platform 110.

The data collection engine 120, failure prediction engine 130 and/or synchronization engine 140 in the FIG. 1 embodiment are each assumed to be implemented using at least one processing device. Each such processing device generally comprises at least one processor and an associated memory, and implements one or more functional modules for controlling certain features of the data collection engine 120, failure prediction engine 130 and/or synchronization engine 140.

At least portions of the cluster synchronization platform 110 and the elements thereof may be implemented at least in part in the form of software that is stored in memory and executed by a processor. The cluster synchronization platform 110 and the elements thereof comprise further hardware and software required for running the cluster synchronization platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, failure prediction engine 130, synchronization engine 140 and other elements of the cluster synchronization platform 110 in the present embodiment are shown as part of the cluster synchronization platform 110, at least a portion of the data collection engine 120, failure prediction engine 130, synchronization engine 140 and other elements of the cluster synchronization platform 110 in other embodiments may be implemented on one or more other processing platforms that are accessible to the cluster synchronization platform 110 over one or more networks. Such elements can each be implemented at least in part within another system element or at least in part utilizing one or more stand-alone elements coupled to the network 104.

It is assumed that the cluster synchronization platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, failure prediction engine 130, synchronization engine 140 and other elements of the cluster synchronization platform 110, and the elements thereof can each be implemented in the form of one or more LXCs running on one or more VMs. Other arrangements of one or more processing devices of a processing platform can be used to implement the data collection engine 120, failure prediction engine 130 and synchronization engine 140, as well as other elements of the cluster synchronization platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the cluster synchronization platform 110 to reside in different data centers. Numerous other distributed implementations of the cluster synchronization platform 110 are possible.

Accordingly, one or each of the data collection engine 120, failure prediction engine 130, synchronization engine 140 and other elements of the cluster synchronization platform 110 can each be implemented in a distributed manner so as to comprise a plurality of distributed elements implemented on respective ones of a plurality of compute nodes of the cluster synchronization platform 110.

It is to be appreciated that these and other features of illustrative embodiments are presented by way of example only, and should not be construed as limiting in any way. Accordingly, different numbers, types and arrangements of system elements such as the data collection engine 120, failure prediction engine 130, synchronization engine 140 and other elements of the cluster synchronization platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the cluster synchronization platform can be offered to cloud infrastructure customers or other users as part of FaaS, CaaS and/or PaaS offerings.

Figure 8:
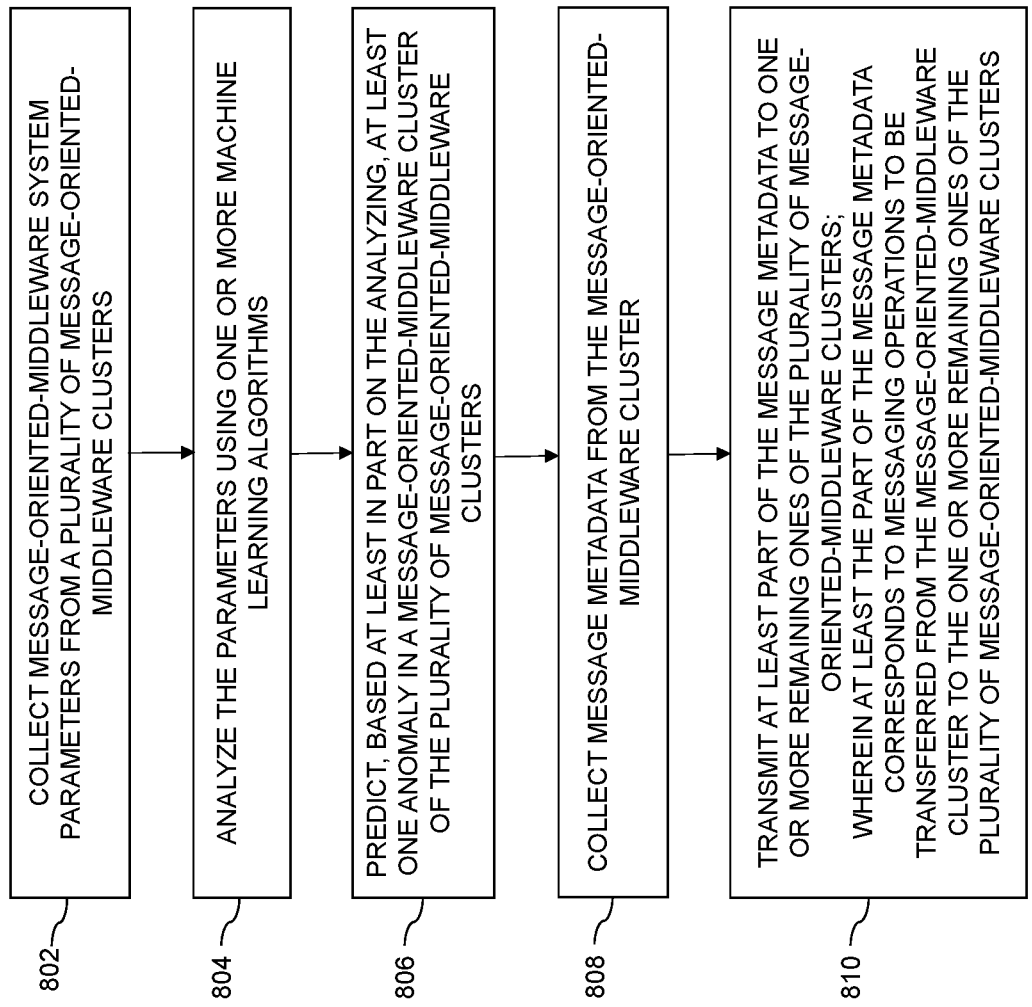
FIG. 8 depicts a process for cluster synchronization according to an illustrative embodiment.

The operation of the information processing system 100 will now be described in further detail with reference to the flow diagram of FIG. 8. With reference to FIG. 8, a process 800 for cluster synchronization as shown includes steps 802 through 810, and is suitable for use in the system 100 but is more generally applicable to other types of information processing systems comprising a cluster synchronization platform configured for synchronizing MOM clusters.

In step 802, MOM system parameters are collected from a plurality of MOM clusters. The plurality of MOM clusters respectively comprise a plurality of nodes. The MOM system parameters comprise at least one of one or more central processing unit utilization parameters, one or more storage utilization parameters, one or more input/output parameters, message queue depth, one or more channel agent values and one or more channel connection agent values.

In step 804, the parameters are analyzed using one or more machine learning algorithms. The one or more machine learning algorithms utilize an unsupervised learning technique to detect one or more outlier parameters of the parameters, and comprise, for example, an isolation forest algorithm. In an embodiment, the one or more machine learning algorithms are trained with training data comprising historical parameter data.

In step 806, based at least in part on the analyzing, at least one anomaly in a MOM cluster of the plurality of MOM clusters is predicted, and in step 808, message metadata is collected from the MOM cluster where the at least one anomaly is predicted. The message metadata comprises at least one of message offset information, last message read information, last message committed information, one or more timestamps, one or more topic attributes and one or more transaction identifiers.

In step 810, at least part of the message metadata is transmitted to one or more remaining ones of the plurality of MOM clusters. The part of the message metadata corresponds to messaging operations to be transferred from the MOM cluster where the at least one anomaly is predicted to the one or more remaining ones of the plurality of MOM clusters.

According to an embodiment, the collecting of the message metadata and the transmitting of at least the part of the message metadata is performed in response to the predicting of the at least one anomaly in the MOM cluster.

In one or more embodiments, the message metadata from the MOM cluster where the at least one anomaly is predicted is compared with message metadata from the one or more remaining ones of the plurality of MOM clusters to determine differences between the message metadata from the MOM cluster where the at least one anomaly is predicted and the message metadata from the one or more remaining ones of the plurality of MOM clusters. Based at least in part on the differences, at least a portion of the message metadata from the one or more remaining ones of the plurality of MOM clusters requiring an update is determined. The part of the message metadata transmitted to the one or more remaining ones of the plurality of MOM clusters corresponds to the message metadata from the one or more remaining ones of the plurality of MOM clusters requiring the update.

In an embodiment, the method further comprises translating the message metadata from a format of a first MOM system to a format of a second MOM system. One or more APIs are provided to one or more MOM clients. The one or more APIs are used by the one or more MOM clients to retrieve at least the part of the message metadata.

It is to be appreciated that the FIG. 8 process and other features and functionality described above can be adapted for use with other types of information systems configured to execute cluster synchronization services in a cluster synchronization platform or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cluster synchronization platform as disclosed herein can provide a number of significant advantages relative to conventional arrangements. For example, the cluster synchronization platform uses machine learning to proactively predict middleware outages to minimize impact on message delivery. The embodiments advantageously leverage an unsupervised learning approach and machine learning models to detect anomalies in MOM clusters and accurately predict outages. By predicting an upcoming outage before it occurs, the embodiments facilitate decision-making for migration of messaging operations to different clusters and eliminate the effects of outages by addressing them prior to their actual occurrence.

As an additional advantage, the embodiments synchronize MOM clusters for MOM client applications to avoid message duplicity and re-connectivity issues when switching operations between different clusters. A cluster synchronization platform synchronizes message metadata between MOM clusters. The synchronization process includes metadata analysis and comparison between clusters and broadcasting of updated metadata to failover clusters.

The embodiments provide for seamless failover of MOM systems, regardless of their type. Outages are predicted using advanced anomaly detection based on MOM system parameter values. Responsive to a predicted outage, the embodiments manage migration of messaging operations from a primary MOM cluster to a failover cluster/server, while maintaining transactional integrity, message delivery guarantees and QoS. The embodiments include techniques for synchronizing metadata between clusters.

By leveraging machine learning for anomaly detection, the embodiments monitor various system parameters including, for example, MOM system metrics. By measuring normal parameter values, the machine learning model detects anomalies when parameter values deviate from normal values. Based on identification of an anomaly, a decision can be made to switch to a secondary cluster before an outage of the primary cluster occurs. While the issues in the primary cluster are investigated, messages can flow through the secondary cluster uninterrupted, maintaining continuity.

The embodiments advantageously allow failover between differently configured MOM providers, where messaging operations are continued from where they left off prior to transfer to a different cluster without duplicity and rework. The embodiments eliminate the need for duplicate message handling and reconnection logic, saving development, integration testing and unit testing resources. The embodiments further provide active-active scalable MOM clusters offering seamless failover and faster migrations in the event of system problems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the cluster synchronization platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cluster synchronization platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
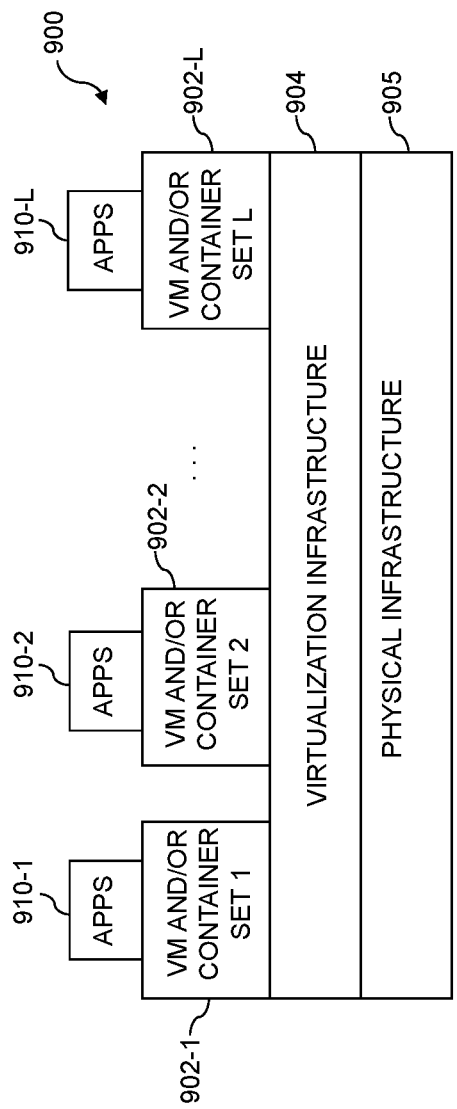
FIGS. 9 and 10 show examples of processing platforms that may be utilized to implement at least a portion of an information processing system according to illustrative embodiments.
Figure 10:
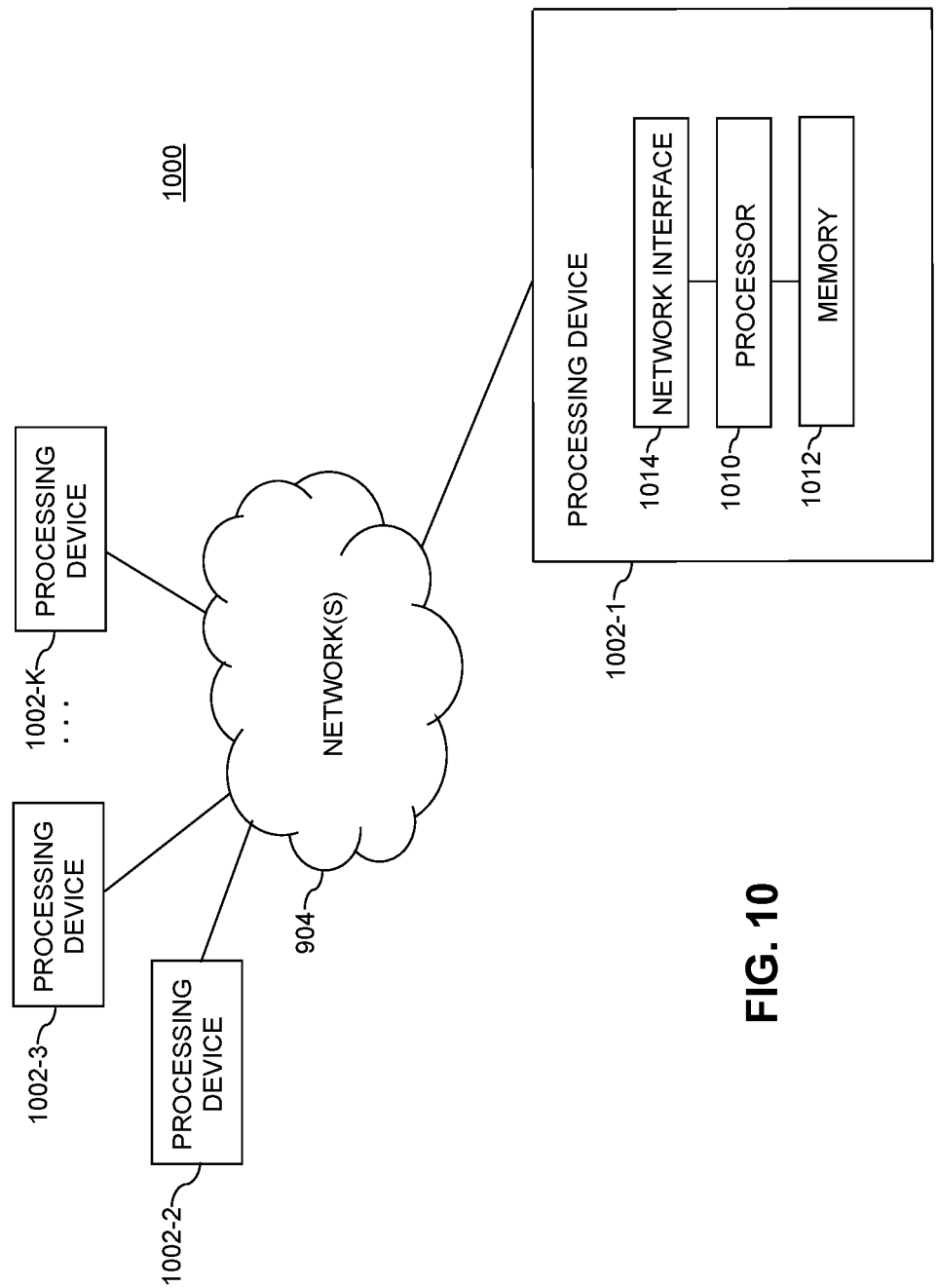

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the cluster synchronization platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cluster synchronization platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    collecting message-oriented-middleware system parameters from a plurality of message-oriented-middleware clusters;
    analyzing the message-oriented-middleware system parameters using one or more machine learning algorithms;
    predicting, based at least in part on the analyzing, at least one anomaly in a message-oriented-middleware cluster of the plurality of message-oriented-middleware clusters;
    collecting message metadata from the message-oriented-middleware cluster based, at least in part, on the predicting;
    transmitting at least part of the message metadata to one or more remaining ones of the plurality of message-oriented-middleware clusters;
    wherein the part of the message metadata corresponds to messaging operations to be transferred from the message-oriented-middleware cluster to the one or more remaining ones of the plurality of message-oriented-middleware clusters, and wherein the part of the message metadata comprises one or more details about progress of message transmission in the message-oriented-middleware cluster, the one or more details including at least one of message offset information and one or more timestamps for messages committed to transmission by the message-oriented-middleware cluster; and synchronizing, based at least in part on the one or more details about the progress of the message transmission, the messaging operations between the message-oriented-middleware cluster and the one or more remaining ones of the plurality of message-oriented-middleware clusters to prevent message duplication between the message-oriented-middleware cluster and the one or more remaining ones of the plurality of message-oriented-middleware clusters;

wherein the synchronizing comprises translating the message metadata from a format of a first message-oriented-middleware system to a format of a second message-oriented-middleware system to permit the second message-oriented-middleware system to process the one or more details about the progress of the message transmission and prevent re-transmission of the messages committed to transmission by the message-oriented-middleware cluster; and wherein the steps of the method are executed by a processing device operatively coupled to a memory.

2. The method of claim 1, wherein the plurality of message-oriented-middleware clusters respectively comprise a plurality of nodes.

3. The method of claim 1, wherein the message-oriented-middleware system parameters comprise at least one of one or more central processing unit utilization parameters, one or more storage utilization parameters, one or more input/output parameters, message queue depth, one or more channel agent values and one or more channel connection agent values.

4. The method of claim 1, wherein the part of the message metadata further comprises at least one of last message read information, last message committed information, one or more topic attributes and one or more transaction identifiers.

5. The method of claim 1, wherein the one or more machine learning algorithms utilize an unsupervised learning technique to detect one or more outlier parameters of the message-oriented-middleware system parameters.

6. The method of claim 5, wherein the one or more machine learning algorithms comprise an isolation forest algorithm.

7. The method of claim 6, further comprising training the one or more machine learning algorithms with training data comprising historical parameter data.

8. The method of claim 1, wherein the collecting of the message metadata and the transmitting of at least the part of the message metadata is performed in response to the predicting of the at least one anomaly in the message-oriented-middleware cluster.

9. The method of claim 1, further comprising comparing the message metadata from the message-oriented-middleware cluster with message metadata from the one or more remaining ones of the plurality of message-oriented-middleware clusters to determine differences between the message metadata from the message-oriented-middleware cluster and the message metadata from the one or more remaining ones of the plurality of message-oriented-middleware clusters.

10. The method of claim 9, further comprising determining, based at least in part on the differences, at least a portion of the message metadata from the one or more remaining ones of the plurality of message-oriented-middleware clusters requiring an update.

11. The method of claim 10, wherein the part of the message metadata transmitted to the one or more remaining ones of the plurality of message-oriented-middleware clusters corresponds to the message metadata from the one or more remaining ones of the plurality of message-oriented-middleware clusters requiring the update.

12. The method of claim 1, further comprising providing one or more application programming interfaces to one or more message-oriented-middleware clients, wherein the one or more application programming interfaces are used by the one or more message-oriented-middleware clients to retrieve at least the part of the message metadata.

13. An apparatus comprising:
a processing device operatively coupled to a memory and configured to:
collect message-oriented-middleware system parameters from a plurality of message-oriented-middleware clusters;
analyze the message-oriented-middleware system parameters using one or more machine learning algorithms;
predict, based at least in part on the analyzing, at least one anomaly in a message-oriented-middleware cluster of the plurality of message-oriented-middleware clusters;
collect message metadata from the message-oriented-middleware cluster based, at least in part, on the predicting;
transmit at least part of the message metadata to one or more remaining ones of the plurality of message-oriented-middleware clusters;
wherein the part of the message metadata corresponds to messaging operations to be transferred from the message-oriented-middleware cluster to the one or more remaining ones of the plurality of message-oriented-middleware clusters, and wherein the part of the message metadata comprises one or more details about progress of message transmission in the message-oriented-middleware cluster, the one or more details including at least one of message offset information and one or more timestamps for messages committed to transmission by the message-oriented-middleware cluster; and
synchronize, based at least in part on the one or more details about the progress of the message transmission, the messaging operations between the message-oriented-middleware cluster and the one or more remaining ones of the plurality of message-oriented-middleware clusters to prevent message duplication between the message-oriented-middleware cluster and the one or more remaining ones of the plurality of message-oriented-middleware clusters;
wherein, in synchronizing, the processing device is configured to translate the message metadata from a format of a first message-oriented-middleware system to a format of a second message-oriented-middleware system to permit the second message-oriented-middleware system to process the one or more details about the progress of the message transmission and prevent re-transmission of the messages committed to transmission by the message-oriented-middleware cluster.

14. The apparatus of claim 13, wherein the plurality of message-oriented-middleware clusters respectively comprise a plurality of nodes.

15. The apparatus of claim 13, wherein the processing device is further configured to compare the message metadata from the message-oriented-middleware cluster with message metadata from the one or more remaining ones of the plurality of message-oriented-middleware clusters to determine differences between the message metadata from the message-oriented-middleware cluster and the message metadata from the one or more remaining ones of the plurality of message-oriented-middleware clusters.

16. The apparatus of claim 15, wherein the processing device is further configured to determine, based at least in part on the differences, at least a portion of the message metadata from the one or more remaining ones of the plurality of message-oriented-middleware clusters requiring an update.

17. An article of manufacture comprising a non-transitory processor-readable storage medium having stored therein program code of one or more software programs, wherein the program code when executed by at least one processing device causes said at least one processing device to perform the steps of:
   collecting message-oriented-middleware system parameters from a plurality of message-oriented-middleware clusters;
   analyzing the message-oriented-middleware system parameters using one or more machine learning algorithms;
   predicting, based at least in part on the analyzing, at least one anomaly in a message-oriented-middleware cluster of the plurality of message-oriented-middleware clusters;
   collecting message metadata from the message-oriented-middleware cluster based, at least in part, on the predicting;
   transmitting at least part of the message metadata to one or more remaining ones of the plurality of message-oriented-middleware clusters;
   wherein the part of the message metadata corresponds to messaging operations to be transferred from the message-oriented-middleware cluster to the one or more remaining ones of the plurality of message-oriented-middleware clusters, and wherein the part of the message metadata comprises one or more details about progress of message transmission in the message-oriented-middleware cluster, the one or more details including at least one of message offset information and one or more timestamps for messages committed to transmission by the message-oriented-middleware cluster; and
   synchronizing, based at least in part on the one or more details about the progress of the message transmission, the messaging operations between the message-oriented-middleware cluster and the one or more remaining ones of the plurality of message-oriented-middleware clusters to prevent message duplication between the message-oriented-middleware cluster and the one or more remaining ones of the plurality of message-oriented-middleware clusters;
   wherein, in synchronizing, the program code causes said at least one processing device to translate the message metadata from a format of a first message-oriented-middleware system to a format of a second message-oriented-middleware system to permit the second message-oriented-middleware system to process the one or more details about the progress of the message transmission and prevent re-transmission of the messages committed to transmission by the message-oriented-middleware cluster.

18. The article of manufacture of claim 17, wherein the plurality of message-oriented-middleware clusters respectively comprise a plurality of nodes.

19. The article of manufacture of claim 17, wherein the program code causes said at least one processing device to further perform the step of comparing the message metadata from the message-oriented-middleware cluster with message metadata from the one or more remaining ones of the plurality of message-oriented-middleware clusters to determine differences between the message metadata from the message-oriented-middleware cluster and the message metadata from the one or more remaining ones of the plurality of message-oriented-middleware clusters.

20. The article of manufacture of claim 19, wherein the program code causes said at least one processing device to further perform the step of determining, based at least in part on the differences, at least a portion of the message metadata from the one or more remaining ones of the plurality of message-oriented-middleware clusters requiring an update.

\* \* \* \* \*